(12) United States Patent
Li et al.

(10) Patent No.: US 9,535,868 B1
(45) Date of Patent: Jan. 3, 2017

(54) APPARATUS AND METHOD FOR NETWORK TRAFFIC CLASSIFICATION AND POLICY ENFORCEMENT

(71) Applicant: Blue Coat Systems, Inc., Sunnyvale, CA (US)

(72) Inventors: Qing Li, Cupertino, CA (US); Min Hao Chen, Milpitas, CA (US); Haibaio Fan, Hayward, CA (US); Wenjing Wang, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/675,611

(22) Filed: Mar. 31, 2015

(51) Int. Cl.
| | |
|---|---|
| *H04L 12/28* | (2006.01) |
| *G06F 13/40* | (2006.01) |
| *G06F 13/42* | (2006.01) |
| *H04L 12/761* | (2013.01) |
| *H04L 12/18* | (2006.01) |
| *H04L 12/753* | (2013.01) |

(52) U.S. Cl.
CPC ....... *G06F 13/4022* (2013.01); *G06F 13/4221* (2013.01); *H04L 12/1886* (2013.01); *H04L 45/16* (2013.01); *H04L 45/48* (2013.01)

(58) Field of Classification Search
CPC .. G06F 11/3409; G06F 9/5088; G06F 9/5055; H04L 41/00; H04L 45/48; H04L 45/16; H04L 12/1886; H04L 12/42
See application file for complete search history.

(56) References Cited

U.S. PATENT DOCUMENTS

| | | | |
|---|---|---|---|
| 8,750,168 B2 * | 6/2014 | Ramakrishnan .... | H04L 12/1886 370/256 |
| 2013/0311628 A1 * | 11/2013 | Kruglick .................. | G06F 8/61 709/223 |

* cited by examiner

*Primary Examiner* — Ernest Unelus
(74) *Attorney, Agent, or Firm* — Baker Botts L.L.P.

(57) ABSTRACT

A machine has a bus, an input port connected to the bus to receive inbound network traffic, an output port connected to the bus to convey outbound network traffic and a processor complex connected to the bus. The processor complex is configured as a pipeline with individual processor cores assigned individual network traffic processing tasks. The pipeline includes a first set of processor cores to construct network traffic trees characterizing the inbound network traffic and the outbound network traffic. Each network traffic tree characterizes traffic type and traffic rate. A second set of processor cores enforces network traffic policies utilizing the network traffic trees. The network traffic policies apply traffic rate control by traffic type for the inbound network traffic and the outbound network traffic.

20 Claims, 7 Drawing Sheets

Inbound
- Collaboration
  - Google-Docs
  - GoTo Meeting
  - WebEx
- Content
  - Amazon
  - Apple-iTunes
  - Craigslist
- Database
  - Oracle
  - PostgresSQL
  - SAP
- Email
  - AOL_Mail
  - Google_mail
  - MS-Exchange
- Fileservices
  - Box
  - Evernote
  - NFS
- Games
  - Doom
  - Quake
  - XboxLive
- SocialNetwork
  - Facebook
  - FIckr
  - Instagram

APPARATUS AND METHOD FOR NETWORK TRAFFIC CLASSIFICATION AND POLICY ENFORCEMENT

FIELD OF THE INVENTION

This invention relates generally to communications in computer networks. More particularly, this invention relates to techniques for network traffic classification and policy enforcement utilizing a pipeline processor complex enforcing granular traffic flow control.

BACKGROUND OF THE INVENTION

Performing application classification and policy enforcement in real-time is a challenge given increasing network speeds. In an enterprise deployment, it may be necessary to enforce tens of thousands of policies with respect to individual enterprise locations, traffic categorizations, application types, inbound traffic flows and outbound traffic flows.

SUMMARY OF THE INVENTION

A machine has a bus, an input port connected to the bus to receive inbound network traffic, an output port connected to the bus to convey outbound network traffic and a processor complex connected to the bus. The processor complex is configured as a pipeline with individual processor cores assigned individual network traffic processing tasks. The pipeline includes a first set of processor cores to construct network traffic trees characterizing the inbound network traffic and the outbound network traffic. Each network traffic tree characterizes traffic type and traffic rate. A second set of processor cores enforces network traffic policies utilizing the network traffic trees. The network traffic policies apply traffic rate control by traffic type for the inbound network traffic and the outbound network traffic.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
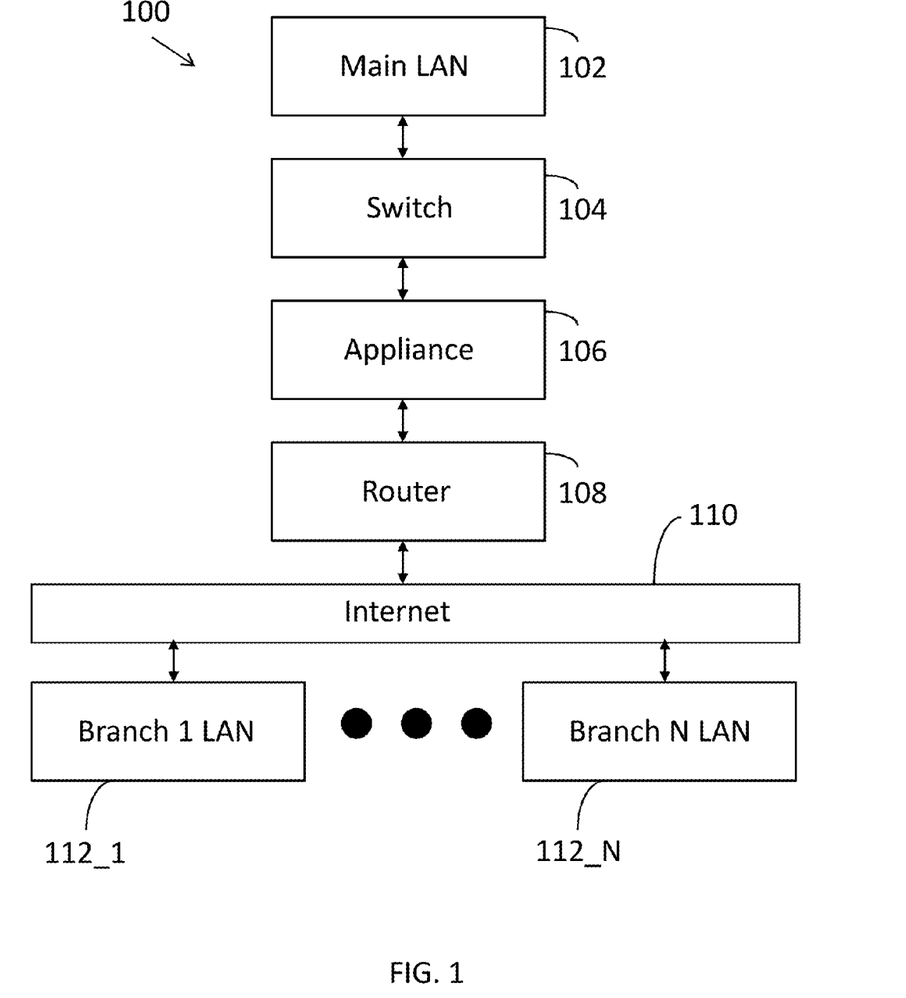
FIG. 1 illustrates a system configured in accordance with an embodiment of the invention.

FIG. 1 illustrates a system 100 configured in accordance with an embodiment of the invention. By way of example, system 100 is an enterprise deployment with a main Local Area Network (LAN) 102 connected to a switch 104. An appliance 106 is also connected to the switch 104. The appliance implements operations of the invention, as discussed below. The appliance 106 may also be connected to a router 108, which interfaces with the internet 110. Various branch LANs 112_1 through 112_N are also connected to the internet 110. The appliance 106 enforces network traffic classification and policy enforcement between the main LAN 102 and the branch LANs 112.

Figure 2:
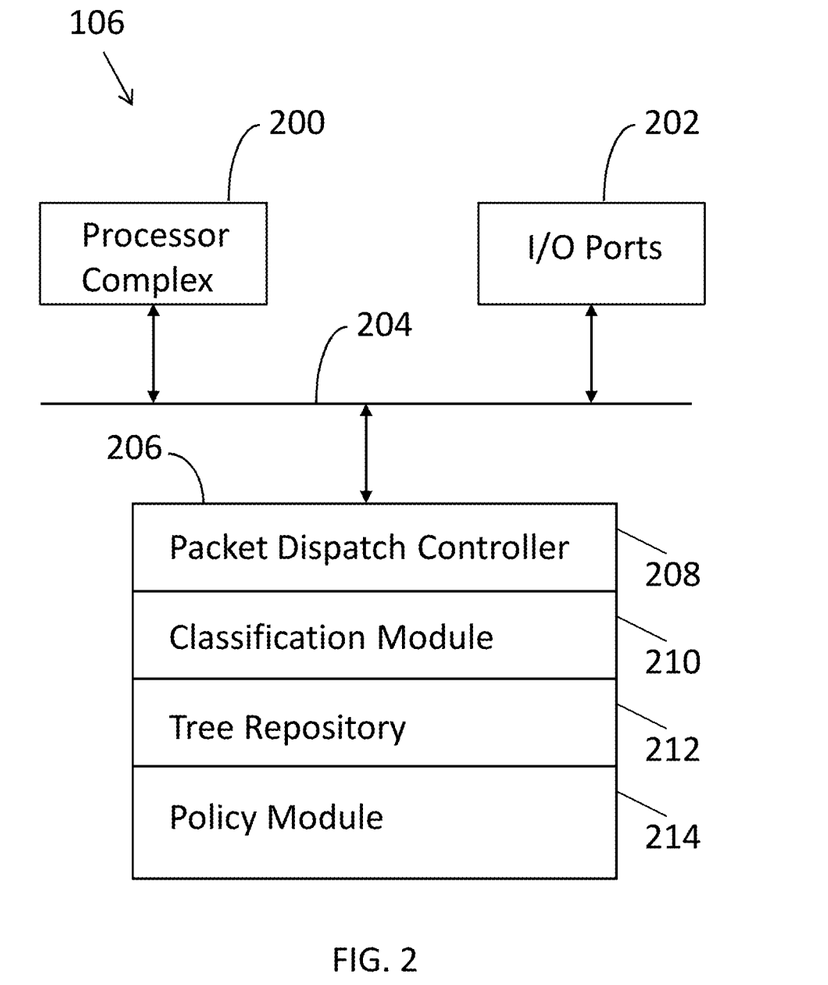
FIG. 2 illustrates an appliance configured in accordance with an embodiment of the invention.

FIG. 2 illustrates the components of an embodiment of the appliance 106. The appliance 106 includes a processor complex 200. The processor complex 200 includes multiple processors (e.g., central processing units). Each processor may include many processor cores. The invention is directed toward the utilization of multiple processor cores in a pipelined manner. The processor cores may be on a single processor or multiple processors.

The processor complex 200 is connected to input/output ports 202 via a bus 204. The input/output ports 202 may include a port for connection with switch 104 and a port for connection with router 108. A port may also be used for connection with a terminal (not shown) that is used to manage the appliance 106.

A memory 206 is also connected to the bus 204. The memory 206 stores instructions executed by the processor complex 200 to implement operations of the invention. In one embodiment, the memory 206 stores a packet dispatch controller 208. The packet dispatch controller 208 receives incoming network traffic and dispatches packets to different processor cores of a classification stage.

A classification module 210 classifies network traffic. More particularly, the classification module 210 segregates network traffic into individual flows of inbound and outbound traffic. That is, an inbound traffic flow tree and an output traffic flow tree are constructed for each network traffic flow. The traffic may be further segregated by enterprise location (e.g., main LAN 102 or a branch LAN 112) or enterprise group (e.g., finance department).

Figure 3:
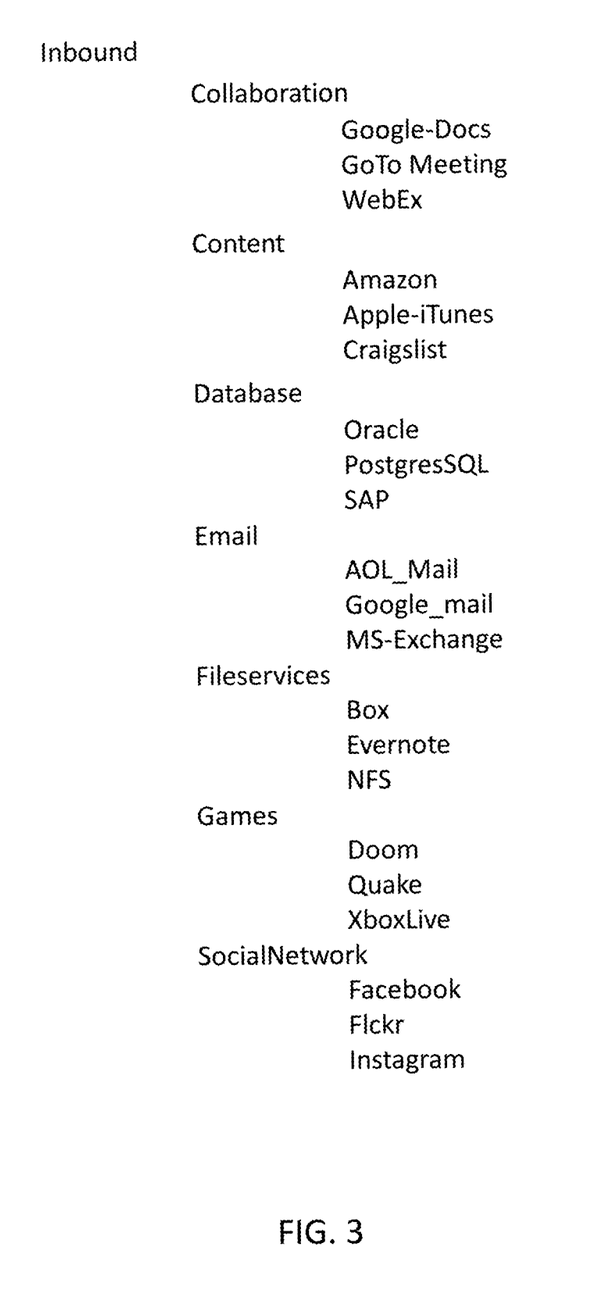
FIG. 3 illustrates a traffic tree utilized in accordance with an embodiment of the invention.

FIG. 3 is an example of a traffic flow tree constructed in accordance with an embodiment of the invention. The tree of FIG. 3 characterizes an inbound traffic flow. The tree may have any number of hierarchical arrangements. In this example, the tree utilizes traffic categories, such as collaboration, content, database, email, file services, games and social network. Within each category, individual applications may be named. For example, in the case of collaboration, individual applications are specified: Google® Docs, GoTo Meeting® and WebEx®. Although not shown in FIG. 3, individual applications may have sub-categories. For example, in the case of Facebook®, sub-categories may include social network activity, games, etc. Individual applications can be part of the tree without belonging to a specific category, for example, Skype®.

Additional categories used in accordance with embodiments of the invention include directory services (e.g., DNS, LDAP, WHOIS), middleware (e.g., ActiveX, JavaRMI, SunRPC), multimedia (e.g., Hulu®, MPEG, Netflix®), network management (SMS, SNMP, Syslog), routing (CBT, IGP, SSDP), security (DLS, GRE, IPSec), and VoIP (H.323, I-Phone, Vonage). As discussed below, each category and each application may be assigned bandwidth parameters. The bandwidth parameters may include a guaranteed rate, a burst rate and a priority value. Categorizations based upon enterprise site (e.g., Branch 1 LAN) and enterprise employee groupings (e.g., employees in the finance department) are also supported.

Returning to FIG. 2, the classification module 212 constructs network traffic trees of the type shown in FIG. 3 and then stores them in a repository 212. The policy module 214 utilizes the network traffic trees to enforce network policies at a granularity of individual branches within the network traffic trees. The policy module 214 determines how individual flows are treated in the context of competing applications. The policy module 214 provides for bandwidth management on a flow-by-flow basis. An enterprise can configure the system to give preferential treatment to specified categories and applications. For example, preferred categories where response times are important, such as online meetings, VoIP and virtual desktops, may be designated. Each flow of mission-critical traffic can be assigned bandwidth necessary for optimum performance.

Policies can keep non-urgent traffic flows from consuming more than an appropriate share of bandwidth. Policy types may include a priority value without specifying a particular rate. A rate policy may be specified. This may be used for congestion avoidance to prevent traffic from being sent at rates higher than what the connection can handle, thereby reducing queuing in router buffers and improving overall efficiency. A discard policy may be used to toss all packets for a traffic class. This policy type may be used for an application that is nonessential to an enterprise and consumes too much network bandwidth. An ignore policy may also be specified to exempt a traffic class from bandwidth allocation and thereby treat it as pass-through traffic. That is, the traffic is not counted as part of the link traffic under management.

The policy module 214 monitors performance with statistics per category, application, enterprise site or enterprise group. For example, the policy module 214 may track bandwidth consumed by applications and web content categories, the response time of key applications by network and server delay, and key statistics, such as TCP health, efficiency and retransmissions to aid in trouble shooting. Real-time performance metrics include mean opinion score, jitter, delay and loss of voice and video conferencing traffic over Real-time Transport Protocol (RTP).

The modules in memory 206 are exemplary. Those modules may be stored in memory of individual processors of the processor complex 200. Modules may be combined or segmented into additional modules.

Figure 4:
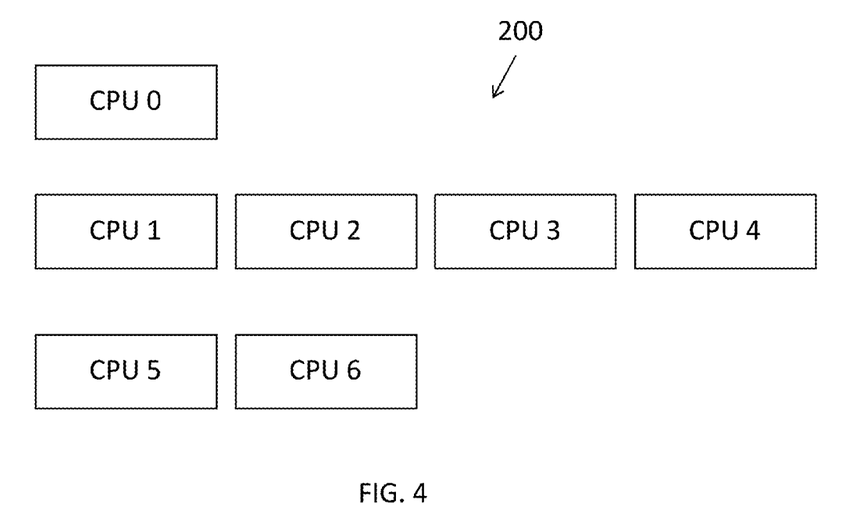
FIG. 4 illustrates a pipelined processor complex utilized in accordance with an embodiment of the invention.

FIG. 4 illustrates a processor complex 200. The processor complex is configured in a pipelined manner to reduce data dependencies. Tasks are assigned to individual processors to fully exploit computational resources. For example, CPU 0 may be assigned to perform packet dispatch operations by executing the packet dispatch controller 208. Another set of processors CPU_1 through CPU_4 may be assigned to perform packet classification by executing the classification module 210. Finally, another set of processors CPU_5 through CPU_6 may be assigned to perform policy enforcement by executing the policy module 214.

The packet dispatch stage associated with CPU 0 may operate as follows. CPU 0 may be connected to a number of network interface circuits that receive network traffic. The processor retrieves packets and performs just enough parsing in order to dispatch packets to the classification stage. In one embodiment, it polls packets from all network interface cards in a round-robin fashion and performs a simple hash based on source and destination IP addresses.

The classification stage associated with CPU1 through CPU4 is segregated so that the same processor always processes packets belonging to the same connection. This stage performs the connection lookup and classifies flows.

The policy enforcement stage associated with CPU5 and CPU6 processes traffic on a directional basis. For example, one processor may process inbound packets, while another processor may process outbound packets. The policy enforcement relates to quality of service (QoS) parameters, such as a guaranteed rate, a burst rate, and the like.

Each stage may be scaled to as many cores as available to achieve optimal throughput. An embodiment of the invention provides 10 Gbps full-duplex processing that supports tens of thousands of quality of service policies. The quality of service policy rates for tens of thousands of policies may have any number of ranges (e.g., from 16 kbps to 500 Mbps), where each packet contributes to the bandwidth computation in real-time. Quality of service policies have the concepts of burst rate, guaranteed rate and priority. Bandwidth updates are reflected in real-time across siblings of the same quality of service class and up the parent/grandparent traffic trees. The classification module 210 must classify real-time traffic, which might involve thousands of applications. The classification module 210 may utilize I/O ports 202 to access external systems to assist in the application classification process.

The pipeline design has each core perform a specific type of workload. Cores are divided into different groups, such that each group performs classification and quality of service tasks according to directionality (inbound traffic and outbound traffic). In order to reduce processor idle time, data dependencies are either completely eliminated or reduced to minimize inter-processor and inter-core locking. As discussed below, embodiments utilize per processor memory partition and memory management, bidirectional ownership transfer mechanisms for contention free inter processor communication and zero-copy memory swapping to eliminate software and hardware input/output bottlenecks.

Figure 5:
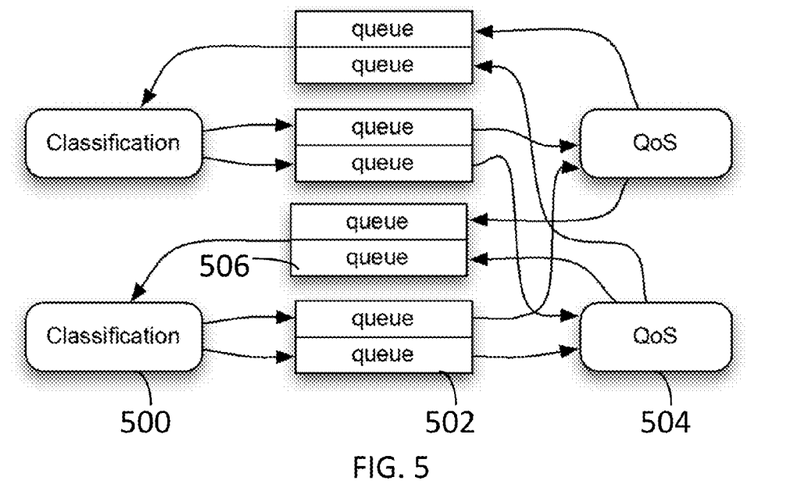
FIG. 5 illustrates lock-free queues utilized between processor stages.

In one embodiment, lock-free queues are used as an interface between pipeline stages, primarily between the classification stage and policy enforcement stage. The lock-free queues are set up to be single-producer single-consumer (SPSC) in order to reduce contentions. One disadvantage of using multiple SPSC queues is that message retrieval may not be in sequence across multiple producers. This issue cannot be completely eliminated, but can be mitigated by first checking the number of current messages available on a queue and only process those message and move on to the next queue. Since the queue is lock-free, draining and processing until the queue is empty may result in heavily favoring the first queue, especially when the traffic is heavier on the first queue. Pseudo-code characterizing this technique is as follows:

FOR all queues
    SET size to queue size
    WHILE size >0 AND queue is not empty
    Process next queue element
    ENDWHILE
ENDFOR There are cases where a packet may need to be re-injected back into the classification stage. Therefore, feedback queues are created. SPSC queues allow policy enforcement processors to feed packets and messages back.

FIG. 5 illustrates a classification processor 500 configured as a single producer for SPSC queue 502. Policy enforcement (QoS) processor 504 is the consumer for SPSC queue 502. A feedback queue 506 allows messages and packets to be returned to the classification stage 500. Observe in FIG. 5 that each SPSC queue has an SPSC configuration with a dedicated feedback queue. This configuration allows for memory-to-memory processing without invoking an operating system (e.g., the Linux kernel space and user space may be bypassed).

Figure 6:
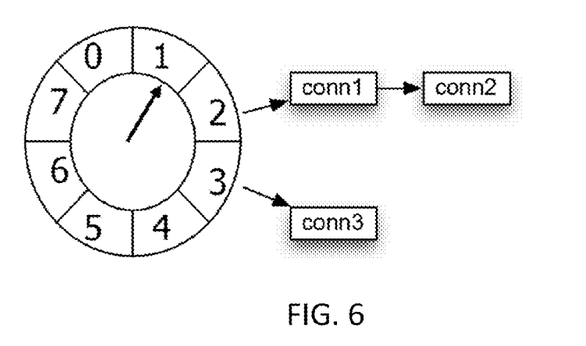
FIGS. 6 and 7 illustrate per-processor timer wheels utilized in accordance with an embodiment of the invention.
Figure 7:
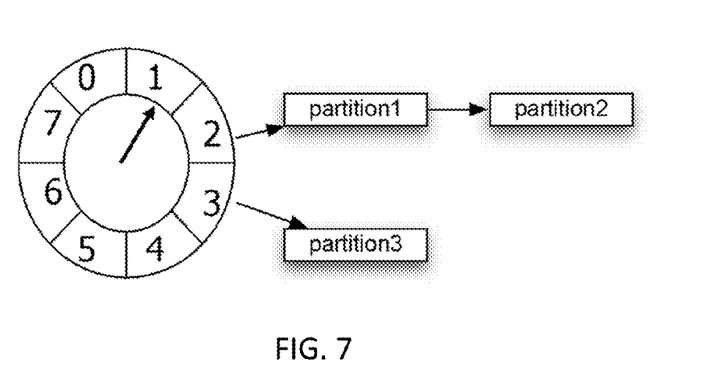

An embodiment of the invention utilizes a per-processor timer wheel. To ensure timers are not contended between threads and result in unwanted timer skew, each packet processing core contains its own timer. Effectively, the system has to run a timer on each classification core and each policy enforcement core. The timer wheel's expiration time is checked on every packet receive loop, and all the entries that have expired on or before the current tick is triggered. A lock-based system timer is also used to schedule background tasks that are not sensitive to timer drifts.

At the first stage of classification, the cores are separated by connection so that packets in the same connection are guaranteed to be on the same thread. This is shown in FIG. 6.

On the second stage of policy enforcement, cores are separated by partition (i.e., the same branch of a network traffic tree). As a result, packets in the same policy enforcement partition are guaranteed to be on the same thread. This is shown in FIG. 7. With these assumptions, the timer wheels are running per-processor based on functionality.

By giving timers specific functions within the system, it is possible to create per-core timers so that moving the dials can remain lock-free, hence reduce the amount of contentions between timers.

Figure 8:
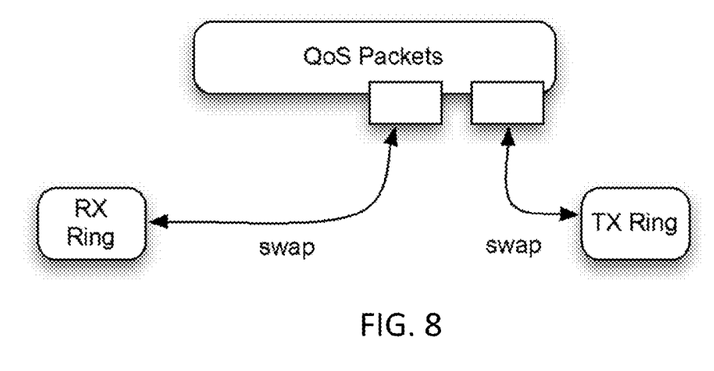
FIG. 8 illustrates packet memory swaps utilized in accordance with an embodiment of the invention.

An embodiment of the invention relates to packet memory swaps. FIG. 8 illustrates QoS packets being swapped from a receive ring to a transmit ring. The ring buffer is allocated with memory from a network interface card. After the user application starts, the memory is allocated on the Linux hugespages. The userspace program swaps out the device memory with its own, with extra memory allocated but set aside as "extra packet buffers" that are used as QoS packets. The number of extra packet buffers determines how many packets can be "set aside" while the application continues to poll packets from the network interface card. These packets are usually delayed or discarded according to the QoS policy. The swap between the QoS packets and the receive (RX) ring or transmit (TX) ring allows the application to fill in holes in the device ring, thereby continuing to retrieve or transmit packets.

Figure 9:
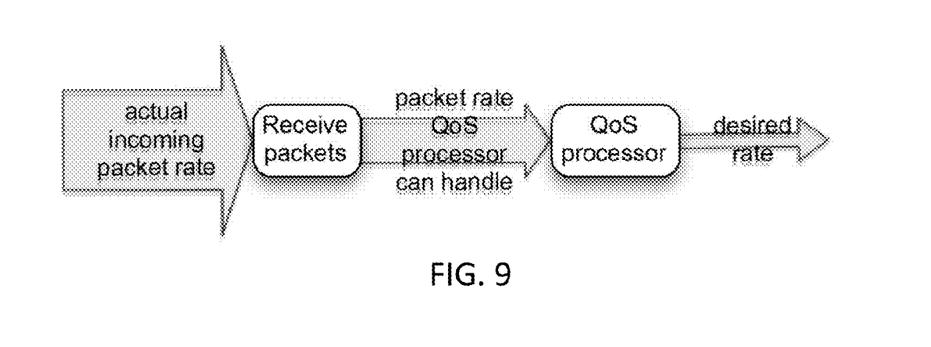
FIG. 9 illustrates policy enforcement on wire speed network traffic.

The QoS processing takes the amount of QoS packets into consideration while queuing packets for traffic regulation. It should effectively allow packet retrieval to drain packets from the RX ring at the line rate, only dropping packets when the regulated pipe is queuing up too many packets to be useful. The pipe is effectively shrunk down before and after QoS processing to accommodate the desired bandwidth, as shown in FIG. 9.

The second pipe shrinks down according to the number of packets already accumulated in the QoS processor, and the number of packets left in the QoS packet resource. The number of packets accumulated in the QoS processor cannot exceed a threshold, since most of the leftover packets will be discarded eventually when the desired rate is not keeping up with the actual incoming packet rate. The number of packets left in the QoS processor cannot be lower than a preset threshold. Otherwise one QoS partition may use up most of the system resources, resulting in unfair partition distributions. The number of QoS packets is calculated based on the number of supported partitions on the platform.

Figure 10:
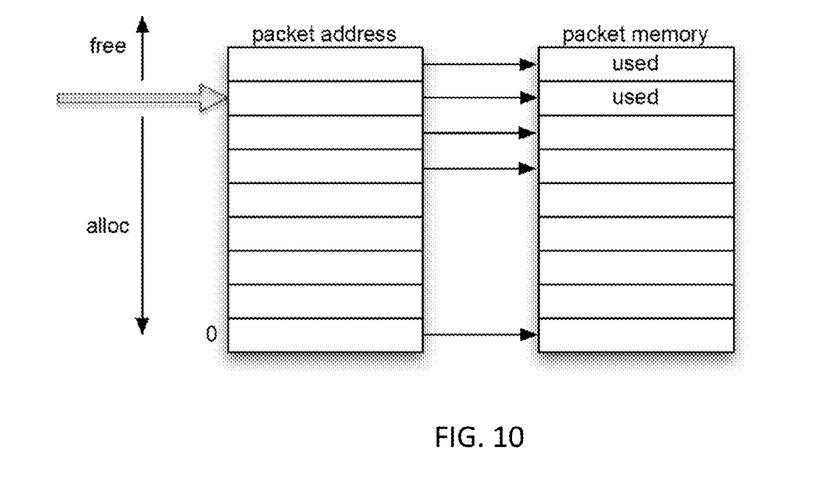
FIG. 10 illustrates per-processor allocation and de-allocation in accordance with an embodiment of the invention.

FIG. 10 illustrates a per-processor packet allocation and de-allocation technique used in accordance with an embodiment of the invention. When a packet is received, a wrapper packet data structure is allocated to keep meta-data about the packet. The frequency allocation and de-allocation of this meta-data plays a critical role in performance. To allow efficient lock-free allocation, all the packet meta-data are pre-allocated on system startup, and addresses are kept in an address array. On allocation, the current index decrements and the address is returned to the requestor. On de-allocation, the address is written back to the current slot and the current index is incremented.

Figure 11:
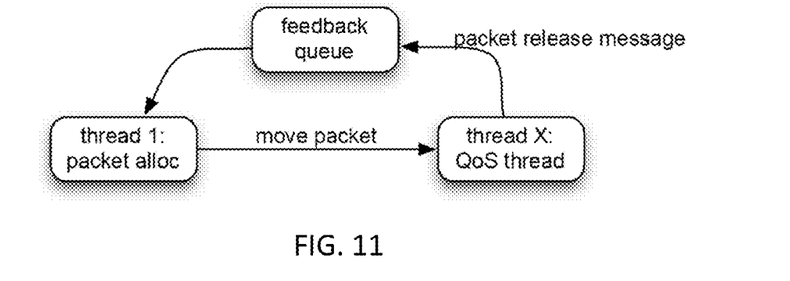
FIG. 11 illustrates per-thread processing utilized in accordance with an embodiment of the invention.

A de-allocation by a thread other than the originally allocated one utilizes the feedback message queue so that the de-allocation task can be performed by the same thread that allocates the packet. This per-thread processing is shown in FIG. 11. Thread 1 allocates the packet. The packet is then moved to the QoS thread (thread X) and is de-allocated in thread X, which provides a packet release message to the feedback queue. The steps can be summarized as followed:
1. Thread 1 allocates the packet, the packet marks its owner as "1" and active thread is "1".
2. Thread 1 releases ownership to thread X, the packet marks its active thread as "X".
3. Thread X de-allocates the packet. Since the packet's owner is different from the active thread (1 !=X), a message is sent back to its owner's feedback queue.
4. If Thread 1 de-allocates the packet instead of thread X, the active thread is equal to the owner thread. In this case, packet memory is freed.

An embodiment of the invention is directed toward a garbage collection technique.

Figure 12:
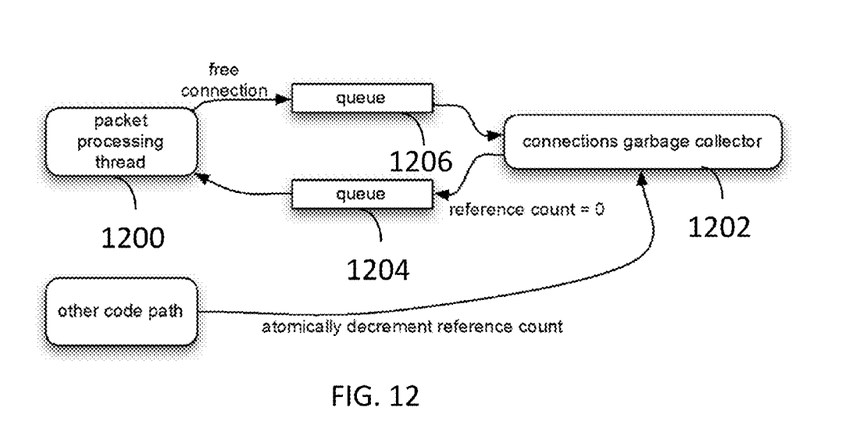
FIG. 12 illustrates garbage collection processing utilized in accordance with an embodiment of the invention.

Connections are created in the first stage of the pipeline and typically the connection data structure needs to stay around until all packets have been processed and all connection timers have stopped. A garbage collector thread is used to monitor reference counts on all the connections, and release ownership back to the packet processing thread when the reference count drops down to zero. Only the packet processing thread that initially creates the connection will move the connection to the garbage collector; while all other code paths including timers, QoS, and others will simply decrement its reference count. This way, connection allocation and de-allocation is lock free. FIG. 12 illustrates a packet processing thread 1200 communicating with a garbage collector 1202 via queues 1204 and 1206.

Memory management should satisfy the following criteria: multi-processor and multi-threading safe, support a variety object sizes, fast speed of allocation and de-allocation, memory leak and multi-free diagnostics, memory usage monitoring and alerts when memory is exhausted, and bookkeeping. The Memory Management System is built by one or more memory zones. Each memory zone manages a group of fixed-sized memory blocks. Each memory block contains a header and a buffer.

In one embodiment, memory is allocated as follows. A memory allocation request is received from an application with the size of the memory and the type of application. Based on the size of the memory, the system determines the proper memory zone to provide. The memory zone finds the available memory block, enters a bookkeeping notation and returns the pointer of the memory buffer. The application then owns the memory buffer and uses it.

Memory is de-allocated as follows. A memory de-allocation request is received from an application with the pointer to a memory buffer. Based on the pointer, the system finds the associated memory block header. With the memory block header, the system puts the memory block back to the free list of the memory zone and makes a bookkeeping notation. The system notifies the application that the memory has been de-allocated.

To support multi-threading, each memory zone has a flag called use_lock and a spin lock called mz_lock. If the use_lock is set to true, mz_lock is used in allocation and de-allocation operations to make sure the operations are safe for multi-threading. The user can specify the use_lock flag when initializing the memory zone.

The design of the memory management system guarantees the allocation and the de-allocation time are constants. The performance is only dependent on the processor speed. The performance is not affected by the size of the memory being managed in the system.

There are two types of problems while the application is using memory improperly. One is failure to de-allocate the memory after allocation. The other is de-allocating the same memory more than once. The memory management system provides methods to display and track these cases.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A machine, comprising:
a bus;
an input port connected to the bus to receive inbound network traffic;
an output port connected to the bus to convey outbound network traffic; and
a processor complex connected to the bus, the processor complex configured as a pipeline with individual processor cores assigned individual network traffic processing tasks, the pipeline including:
a first set of processor cores to construct a first network traffic tree characterizing the inbound network traffic and a second network traffic tree characterizing the outbound network traffic, where the first and second network traffic trees characterize at least one traffic type and at least one traffic rate, and where the first and second network traffic trees are different from each other with respect to at least one traffic type or at least one traffic rate, and
a second set of processor cores to enforce network traffic policies utilizing the first and second network traffic trees constructed by the first set of processor cores, where the network traffic policies:
enforce traffic rate control by traffic type on the inbound network traffic and the outbound network traffic; and
enforce a burst rate and a priority class per network traffic flow.

2. The machine of claim 1 wherein the first set of processor cores includes a first processor core to process the inbound network traffic and a second processor core to process the outbound network traffic.

3. The machine of claim 1 wherein the second set of processor cores includes a third processor core to enforce traffic rate control on the inbound network traffic and a fourth processor core to enforce traffic rate control on the outbound network traffic.

4. The machine of claim 1 wherein traffic type includes a traffic category and a set of applications corresponding to the traffic category.

5. The machine of claim 1 wherein the traffic type includes an enterprise location.

6. The machine of claim 1 wherein the traffic type includes an enterprise group.

7. The machine of claim 1 wherein the network traffic policies further enforce a guaranteed traffic rate.

8. The machine of claim 1 further comprising lock-free queues between the first set of processor cores and the second set of processor cores.

9. The machine of claim 8 wherein a lock-free queue is configured to receive input from a single processor core of the first set of processor cores and supply output to a single processor core of the second set of processor cores.

10. The machine of claim 8 further comprising a feedback queue to receive input from a single processor core of the second set of processor cores and supply output to a single processor core of the first set of processor cores.

11. The machine of claim 8 wherein a first processor core of the first set of processor cores allocates a network packet and a second processor core of the second set of processor cores de-allocates the network packet and writes a message to a lock-free queue for consumption by the first processor core.

12. The machine of claim 1 wherein each processor core of the first set of processor cores has a timer wheel.

13. The machine of claim 1 wherein each processor core of the first set of processor cores is configured so that each network connection is assigned to a single thread.

14. The machine of claim 1 wherein each processor core of the second set of processor cores is configured so that network packets belonging to the same partition are assigned to a single thread.

15. A method, comprising:
receiving, by an input port connected to a bus, inbound network traffic;
conveying, by an output port connected to the bus, outbound network traffic;
constructing a first network traffic tree characterizing the inbound network traffic and a second network traffic tree characterizing the outbound network traffic, where the first and second network traffic trees characterize at least one traffic type and at least one traffic rate, and where the first and second network traffic trees are different from each other with respect to at least one traffic type or at least one traffic rate,
enforcing, by a second set of processor cores, network traffic policies utilizing the first and second network traffic trees constructed by the first set of processor cores, where the network traffic policies:
enforce traffic rate control by traffic type on the inbound network traffic and the outbound network traffic; and
enforce a burst rate and a priority class per network traffic flow; and
wherein a processor complex connected to the bus is configured as a pipeline with individual processor cores assigned individual network traffic processing tasks, the pipeline including the first set of processor cores and the second set of processor cores.

16. The method of claim 15, wherein the first set of processor cores includes a first processor core and a second processor core, and further comprising:
processing, by the first processor core, the inbound network traffic; and
processing, by the second processor core, the outbound network traffic.

17. The method of claim 15, further comprising implementing lock-free queues between the first set of processor cores and the second set of processor cores.

18. A system, comprising:
a bus;
an input port connected to the bus to receive inbound network traffic;
an output port connected to the bus to convey outbound network traffic;
a router connected to at least one of the input port and the output port, where the router is configured to communicate with the internet;
a switch connected to at least one of the input port and the output port, where the switch is configured to communicate with a local area network; and
a processor complex connected to the bus, the processor complex configured as a pipeline with individual processor cores assigned individual network traffic processing tasks, the pipeline including:
a first set of processor cores to construct a first network traffic tree characterizing the inbound network traffic and a second network traffic tree characterizing the outbound network traffic, where the first and second network traffic trees characterize at least one traffic type and at least one traffic rate, and where the first and second network traffic trees are different from each other with respect to at least one traffic type or at least one traffic rate, and
a second set of processor cores to enforce network traffic policies utilizing the first and second network traffic trees constructed by the first set of processor cores, where the network traffic policies:
enforce traffic rate control by traffic type on the inbound network traffic and the outbound network traffic; and
enforce a burst rate and a priority class per network traffic flow.

19. The system of claim 18, wherein the first set of processor cores includes a first processor core to process the inbound network traffic and a second processor core to process the outbound network traffic.

20. The system of claim 18, further comprising lock-free queues between the first set of processor cores and the second set of processor cores.

* * * * *